United States Patent
Haney et al.

(10) Patent No.: US 6,217,770 B1
(45) Date of Patent: Apr. 17, 2001

(54) APPARATUS AND METHOD FOR TREATMENT OF WATER

(75) Inventors: Harold Ernest Haney, San Patricio Garza Garcia (MX); Viktor Mogourian, Winnipeg (CA)

(73) Assignee: ATP International, Santa Catarina (MX)

( * ) Notice: Subject to any disclaimer, the term of this patent is extended or adjusted under 35 U.S.C. 154(b) by 0 days.

(21) Appl. No.: 09/134,536

(22) Filed: Aug. 14, 1998

(51) Int. Cl.[7] .................................................. B01D 61/00
(52) U.S. Cl. .................... 210/636; 210/650; 210/321.69; 210/791; 210/652; 137/583; 137/211
(58) Field of Search ..................... 210/650, 651, 210/652, 257.2, 195.2, 636, 321.71, 321.69, 791; 137/583, 211

(56) References Cited

U.S. PATENT DOCUMENTS

| | | |
|---|---|---|
| 2,785,806 | 3/1957 | Brown et al. . |
| 3,786,924 | 1/1974 | Huffman . |
| 3,827,561 | * 8/1974 | Serfass et al. .................. 210/321.71 |
| 3,846,295 | 11/1974 | Gibbs . |
| 3,856,676 | 12/1974 | Grimme, Jr. et al. . |
| 4,071,453 | 1/1978 | Koslowski . |
| 4,125,463 | 11/1978 | Chenoweth . |
| 4,169,789 | 10/1979 | Lerat . |
| 4,176,063 | 11/1979 | Tyler . |
| 4,222,871 | * 9/1980 | Lefeuvre ................................. 21/636 |
| 4,559,138 | * 12/1985 | Harms, II .......................... 210/493.1 |
| 4,623,467 | 11/1986 | Hamlin . |
| 4,744,895 | 5/1988 | Gales et al. . |
| 4,935,143 | * 6/1990 | Koop et al. .......................... 210/636 |
| 4,969,991 | 11/1990 | Valadez . |
| 5,066,402 | 11/1991 | Anselme et al. . |
| 5,112,489 | 5/1992 | Hartmann . |
| 5,131,277 | 7/1992 | Birdsong et al. . |
| 5,139,678 | 8/1992 | Frederick, Jr. et al. . |
| 5,178,766 | 1/1993 | Ikeda et al. . |
| 5,203,998 | * 4/1993 | Benian ............................. 210/493.5 |
| 5,285,903 | 2/1994 | Sorenson et al. . |
| 5,399,263 | 3/1995 | Chomka et al. . |
| 5,484,529 | 1/1996 | Malugade et al. . |
| 5,500,113 | 3/1996 | Hartley et al. . |
| 5,647,973 | 7/1997 | Desavlniers . |
| 5,690,829 | 11/1997 | Lauer . |
| 5,795,476 | * 8/1998 | Haney ............................. 210/257.2 |
| 5,951,871 | * 9/1999 | Gannon ................................ 210/650 |

FOREIGN PATENT DOCUMENTS

| | | |
|---|---|---|
| 42 24 690 | 1/1974 | (DE) . |
| 0126714 | 11/1984 | (EP) . |
| 0678326 | 10/1995 | (EP) . |
| WO 80/00310 | 3/1980 | (WO) . |
| WO 93/24212 | 12/1993 | (WO) . |
| WO 93/24419 | 12/1993 | (WO) . |

* cited by examiner

Primary Examiner—Ana Fortuna
(74) Attorney, Agent, or Firm—Pillsbury Winthrop LLP

(57) ABSTRACT

A water treatment process using a membrane separation apparatus to separate clean product water from a contaminated water source, the membrane is provided within a housing having inlet ports for collecting concentrated and product water, and the apparatus also includes a concentration chamber and a venturi for injecting gas in the concentration chamber and producing a return stream.

13 Claims, 9 Drawing Sheets

APPARATUS AND METHOD FOR TREATMENT OF WATER

BACKGROUND OF THE INVENTION

This invention relates to an apparatus and method for treatment of water.

This application is related to U.S. applications Ser. Nos. 08/655,744 filed May 31, 1996 and 08/762668 filed Dec. 9, 1996, the disclosures of which are incorporated herein by reference. These applications corresponds to PCT International Application No. PCT/CA97/00378 which was published on Dec. 11th, 1997 under publication No. WO 97/46305.

The above application discloses a method of treatment of water which includes: providing a housing having a first port and a second port; providing in the housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom; communicating the raw water from the water supply to the first port to pass over the membrane such that product water passes through the membrane leaving contaminants in the raw water to form a concentrated contaminated water stream and passing the stream to the second port; providing a product water outlet port in the housing connected to the carrier duct for receiving product water therefrom; extracting contaminants from the concentrated contaminant water stream to form a return stream; and returning at least some of the return stream to the housing at said one of the first and second ports to pass again over the element.

This arrangement has shown considerable commercial success. However improvements to the system are always necessary to enhance operation.

SUMMARY OF THE INVENTION

It is one object of the present invention, therefore to provide an improved water treatment method of the above type in which the operation of the separation membrane and the contaminant separation operation is enhanced.

According to a first aspect of the invention there is provided a method of treating raw contaminated water from a water supply comprising:

providing a housing having a first port and a second port;

providing in the housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom;

communicating the raw water from the water supply to the first port to pass over the membrane such that product water passes through the membrane leaving contaminants in the raw water to form a concentrated contaminated water stream and passing the stream to the second port;

providing a product water outlet port in the housing connected to the carrier duct for receiving product water therefrom;

extracting contaminants from the concentrated contaminated water stream in a concentration chamber to form a return stream;

returning at least some of the return stream to the housing at said one of the first and second ports to pass again over the element;

and injecting gas into the water at a position in the system such that the concentrated contaminant water stream when it enters the concentration contains injected gas.

Preferably the gas is at least primarily air.

Preferably the gas is injected at a position where the water is under pressure from the pump.

Preferably the contaminants are extracted by feeding the concentrated contaminated water stream from said other of the first and second ports to a concentration chamber which is configured to reduce the velocity of the stream to cause by the velocity change deposition of some of the contaminants therefrom so as to settle in and collect in the concentration chamber, the concentration chamber being arranged such that the stream when extracted therefrom leaves the deposited contaminants in the chamber.

Preferably the injected water from the element passes into the concentration chamber where excess gas above saturation from the water collects as a cap in the chamber.

Preferably pressure in the cap is periodically released to cause expansion of the cap to effect purging of the chamber.

Preferably there is provided a main pump for pumping the raw water from the source to an increased operating pressure and wherein the air is injected downstream of the main pump.

Preferably the amount of gas injected is arranged such that oxidizing agents in the gas are substantially wholly consumed in oxidizing contaminants in the water so that the return stream of water is saturated with low reactivity gases such as nitrogen.

Preferably the bubbles in the gas produced by the venturi increase the flocculation of particulate contaminants such that the flocculated contaminants collect in the chamber.

Preferably the gas injection causes fine crystallization of low molecular weight organics.

Preferably the injected gas is arranged to displace more volatile, less soluble contaminant gases such as methane or hydrogen sulfide and including extracting the volatile contaminant gases.

Preferably the volatile contaminant gases are collected in an air cap in the concentration chamber.

Preferably the air cap is maintained at a predetermined volume by a gas release valve having a discharge opening at a predetermined intended water level.

Preferably the gas release valve includes a slow discharge opening for continuous slow release of the gas.

Preferably the membrane surface is scrubbed by the gas as gas dissolved in the water is released by the pressure drop across the membrane.

Preferably the air is injected by a venturi.

Preferably the venturi comprises:

a tubular member arranged for connection to a first pipe at a first end and a second pipe at a second end;

the tubular member defining an interior bore and having an abutment shoulder within the bore;

the tubular member having an opening in one side;

and an insert member with a cylindrical body arranged for insertion into the interior bore and a head at one end defining a flange at said one end for engaging said abutment shoulder;

the insert member having a venturi duct passing through the body from said one end to the opposite end at the second sleeve;

the insert member having an air injection bore at right angles to the venturi duct and communicating with the opening.

Preferably the tubular member comprises a T-fitting with a first pipe receptacle at the first end, a second pipe receptacle at the second end and a third pipe receptacle at the opening at the side and wherein the shoulder is defined by an end abutment of the first receptacle.

Preferably the tubular member comprises a tubular pipe having a cylindrical interior bore and at least one collar attached to the interior bore with one side face of the collar defining said abutment shoulder.

Preferably the tubular pipe has a first collar attached to the interior bore with one side face of the collar defining said abutment shoulder and a second collar spaced longitudinally of the first collar, the second collar having an inner diameter less than that of the first collar and the cylindrical body of the insert member having a stepped portion of reduced diameter engaging into the second collar.

According to a second aspect of the invention there is provided a venturi for attachment to two pipe portions for injecting a second fluid into a first fluid flowing through the pipe portions comprising:

a tubular member arranged for connection to a first pipe portion at a first end and a second pipe portion at a second end;

the tubular member defining an interior bore and having an abutment shoulder within the bore;

the tubular member having an opening in one side;

and an insert member with a cylindrical body arranged for insertion into the interior bore and a head at one end defining a flange at said one end for engaging said abutment shoulder;

the insert member having a venturi duct passing through the body from said one end to the opposite end at the second sleeve;

the insert member having an air injection bore at right angles to the venturi duct and communicating with the opening.

According to a third aspect of the invention there is provided a method of treating raw contaminated water from a water supply comprising:

providing a separator housing having a first port and a second port;

providing in the separator housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom;

in a first direction, communicating the raw water from the water supply to the first port to pass over the membrane such that product water passes through the membrane leaving contaminants in the raw water to form a concentrated contaminated water stream and passing the stream to the second port;

in a second direction, communicating the raw water from the water supply to the second port to pass over the membrane such that product water passes through the membrane leaving contaminants in the raw water to form a concentrated contaminated water stream and passing the stream to the first port;

periodically reversing the direction between the first direction and the second direction;

providing a product water outlet port in the housing connected to the carrier duct for receiving product water therefrom;

collecting the concentrated contaminant water stream to form a return stream, extracting contaminants from the stream and returning at least some of the stream to the housing at said one of the first and second ports to pass again over the element;

providing a first and a second filter element, each arranged adjacent a respective one of the first and second ports such that water flowing through the respective one of the first and second ports also flows through the respective filter element;

the first and second ports, the first and second filter elements, the collection of the concentrated contaminant water stream and the return stream being arranged such that, in the first direction, the return stream passes through the first filter element in a first filter direction to the first port and the concentrated contaminant water stream exits from the second port through the second filter element in a first filter direction and such that, in the second direction, the return stream passes through the second filter element in a second filter direction to the second port and the concentrated contaminant water stream exits from the first port through the first filter element in a second filter direction.

Preferably the first and second filter elements each have a separate filter housing mounted externally of the separator housing.

Preferably the first and second filter elements include a filter screen formed of an electron deficient material such as stainless steel.

Preferably the method includes applying a voltage to the filter screen.

Preferably the voltage is DC or slowly alternating.

Preferably the first and second filter elements each comprise:

a tubular filter housing having first and second end caps;

a first port at one end cap;

a second port in the tubular housing;

a cylindrical filter screen mounted in the housing and attached to and carried by the end caps such that the first port communicates with the interior of the cylindrical filter screen and the second port communicates with an area outside the filter screen;

the filter screen comprising a rigid, perforated cylindrical support, a fabric screen wrapped around the support and a covering layer wrapped around the fabric screen;

whereby the fabric screen is supported for flow therethrough in both directions.

Preferably the fabric screen and the covering layer are attached to bands extending longitudinally of the support.

Preferably the fabric screen and the covering layer are wrapped by bands extending circumferentially of the support.

Preferably the perforated support comprises a well screen with a collar welded to each end.

Preferably the filter screen comprises at least two portions connected end to end by a support collar.

Preferably the first and second filter elements each comprise:

a tubular filter housing having first and second end caps;

a first port at one end cap;

a second port in the tubular housing;

a tubular filter screen mounted in the housing and attached to and carried by the end caps such that the first port communicates with the interior of the cylindrical filter screen and the second port communicates with an area outside the filter screen;

the filter screen comprising a plurality of longitudinally extending rods, end plates supporting the rods in parallel spaced relation and a fabric screen wrapped around the rods;

the rods including an outer set and an inner set;

the fabric screen being wrapped outside the outer rods and inside the inner rods so as to form a convoluted path.

Preferably the inner set of rods lies on a first imaginary cylinder and the outer set of rods lies on a second imaginary cylinder larger in diameter than the first.

Preferably the rods are connected to a source of a voltage for communicating the voltage to the fabric screen.

According to a fourth aspect of the invention there is provided a filter element comprising:

a tubular filter housing having first and second end caps;

a first port at one end cap;

a second port in the tubular housing;

a cylindrical filter screen mounted in the housing and attached to and carried by the end caps such that the first port communicates with the interior of the cylindrical filter screen and the second port communicates with an area outside the filter screen;

the filter screen comprising a rigid, perforated cylindrical support, a fabric screen wrapped around the support and a covering layer wrapped around the fabric screen;

whereby the fabric screen is supported for flow therethrough in both directions.

Preferably the fabric screen and the covering layer are attached to bands extending longitudinally of the support.

Preferably the fabric screen and the covering layer are wrapped by bands extending circumferentially of the support.

Preferably the perforated support comprises a well screen with a collar welded to each end.

Preferably the filter screen comprises at least two portions connected end to end by a support collar.

Preferably a filter element comprising:

a tubular filter housing having first and second end caps;

a first port at one end cap;

a second port in the tubular housing;

a tubular filter screen mounted in the housing and attached to and carried by the end caps such that the first port communicates with the interior of the cylindrical filter screen and the second port communicates with an area outside the filter screen;

the filter screen comprising a plurality of longitudinally extending rods, end plates supporting the rods in parallel spaced relation and a fabric screen wrapped around the rods;

the rods including an outer set and an inner set;

the fabric screen being wrapped outside the outer rods and inside the inner rods so as to form a convoluted path.

Preferably the inner set of rods lies on a first imaginary cylinder and the outer set of rods lies on a second imaginary cylinder larger in diameter than the first.

Preferably the rods are connected to a source of a voltage for communicating the voltage to the fabric screen.

BRIEF DESCRIPTION OF THE DRAWINGS

One embodiment of the invention will now be described in conjunction with the accompanying drawings in which.

In the drawings like characters of reference indicate corresponding parts in the different figures.

In the drawings like characters of reference indicate corresponding parts in the different figures.

DETAILED DESCRIPTION

The present application discloses a number of improvements relating to the arrangement shown in the above US applications and particularly U.S. application 08/762,668, filed Dec. 9, 1996. That application discloses in detail the construction of various components of the present system and reference to that application may be necessary to complete some details of the present application.

Figure 1:
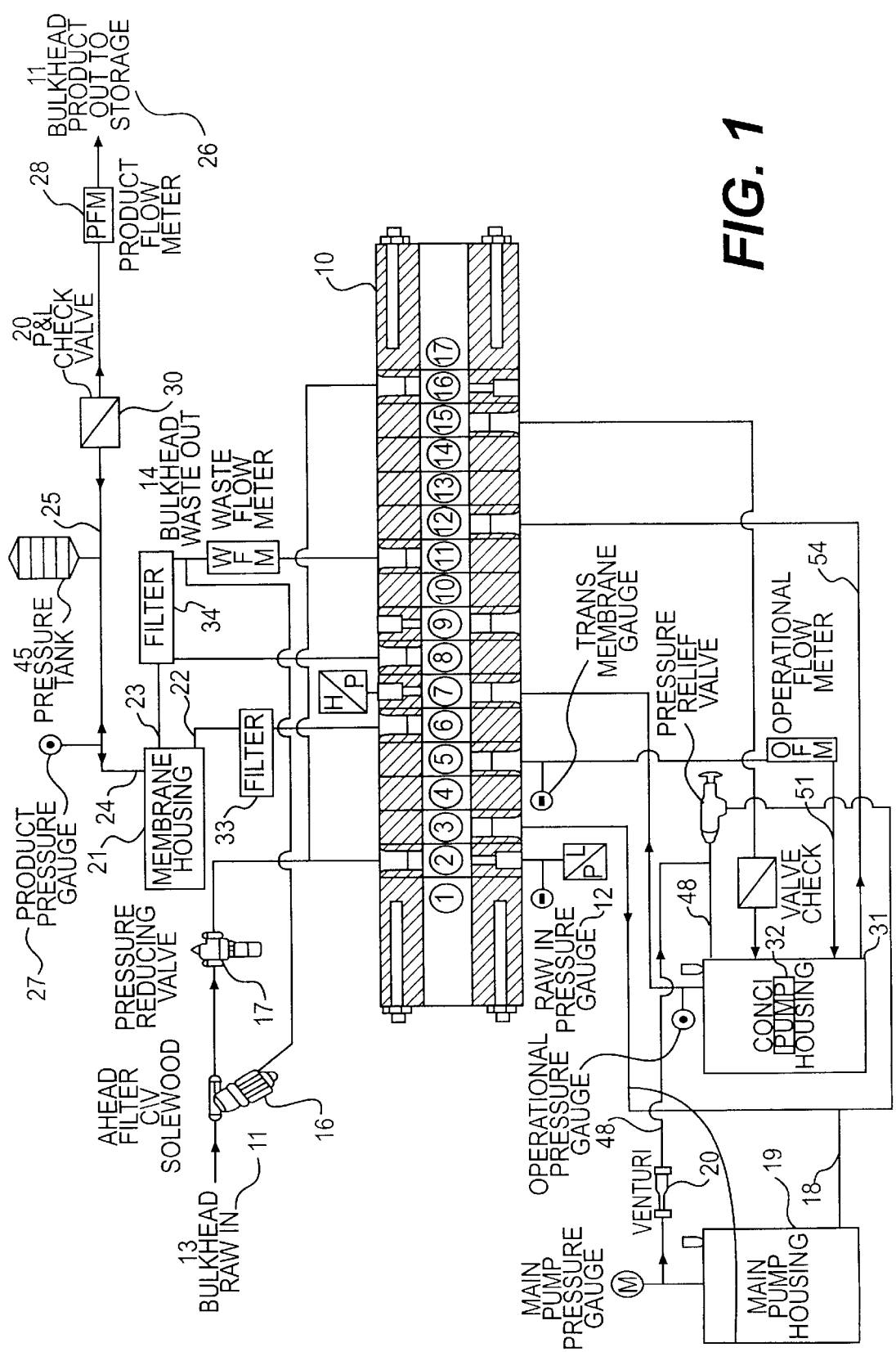
FIG. 1 is a schematic layout of a first water treatment method and apparatus according to the present invention.
Figure 2:
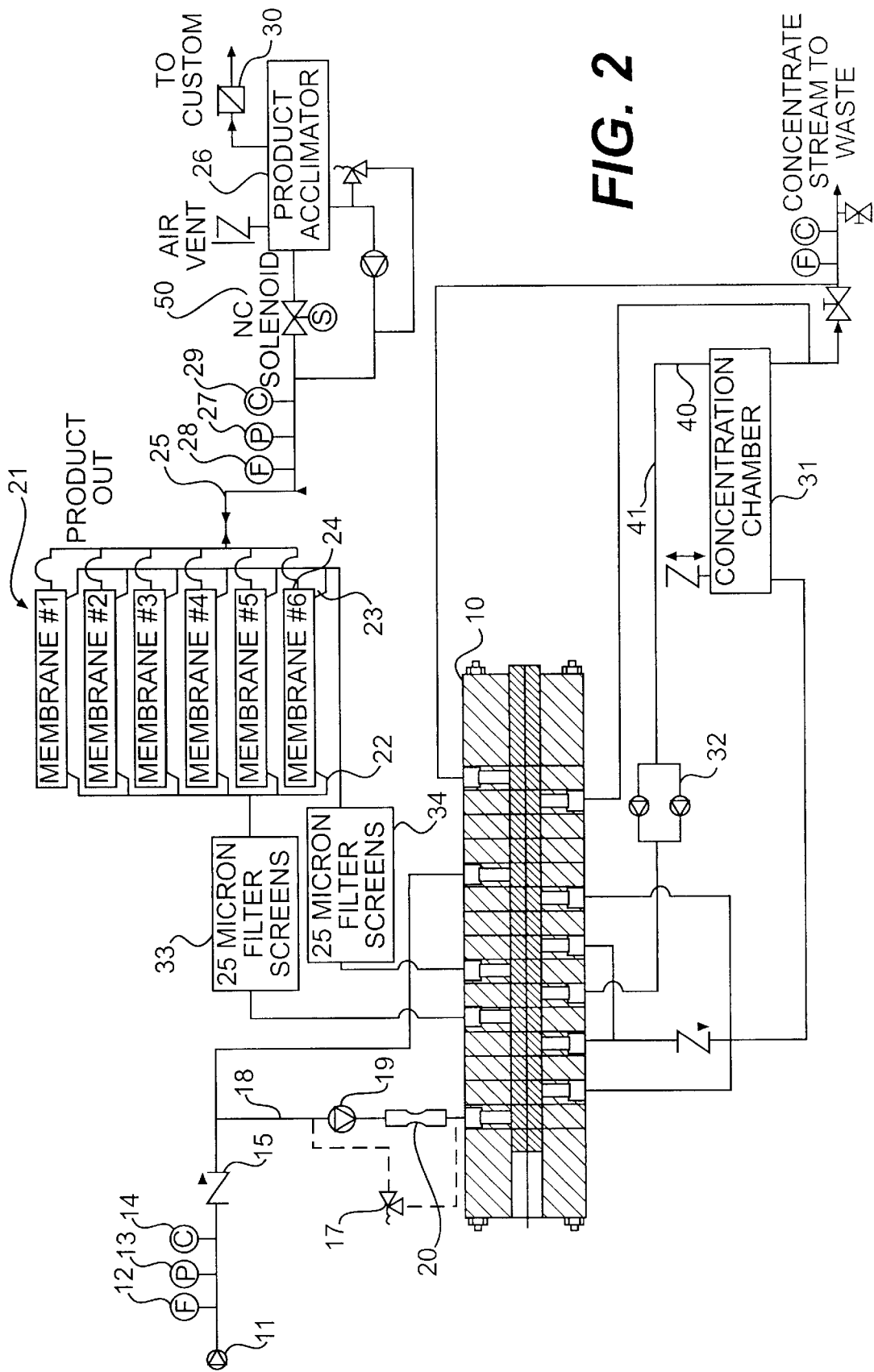
FIG. 2 is a schematic layout of a second water treatment method and apparatus according to the present invention.
Figure 3:
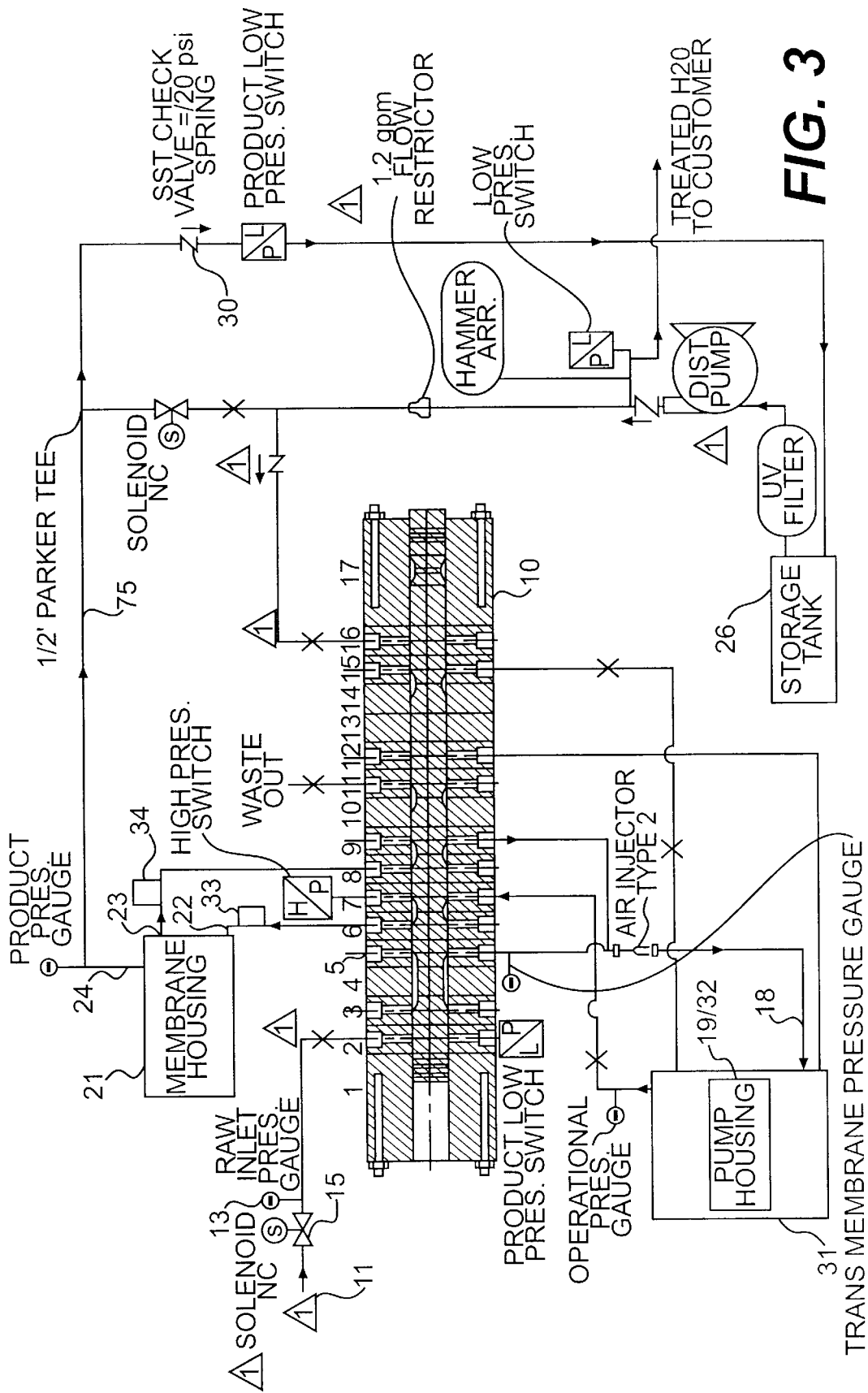
FIG. 3 is a schematic layout of a second water treatment method and apparatus according to the present invention.

The general system is shown in three similar but slightly different arrangements in FIGS. 1, 2 and 3. Each of the systems of FIGS. 1, 2 and 3 includes a main control valve 10 of the type described in detail in the above applications. This controls the flow of water to various elements of the system and will not be described in detail herein.

The systems further include a source 11 of raw water to be treated. At the source is provided a flow meter 12, a pressure gauge 13 and a conductivity meter 14. The flow is controlled by a check valve 15 and by control valves 16 and 17 as required. The raw water is fed to the input line 18 of a main pump 19. A venturi 20 is provided which is arranged to inject air into the system. In FIGS. 1 and 2, the venturi is arranged downstream of the main pump so as to inject air into the raw water supply under the pressure of the main pump. In FIG. 3, the air injector venturi is located before the main pump and immediately prior to the concentration chamber. The injector can be located at any suitable point in the system so that the water when under pressure and entering the concentration chamber contains pressurized air bubbles.

Each system further includes a membrane system generally indicated at 21 which of the type described in the above application.

In general the membrane system comprises one or more membrane elements each having a first port 22, a second port 23 and a third port 24.

Inside the membrane element is provided a membrane which is configured so that the water to be treated passes across one surface of the membrane allowing water to pass through the membrane to be collected and carried by a water conducting layer. The water conducting layer carries the product water which has passed through the membrane and is therefore substantially free from contaminants and carries the product water to a carrier duct communicating with the outlet port 24.

The membrane is arranged so that water can be fed to the port 22 and discharged from the port 23 or vice versa. The arrangement thus takes raw water at one port and discharges water with a higher proportion of contaminants than the raw water at the discharge port due to the extraction of the product water through the membrane.

The product at the port 24 is carried through a discharge line 25 to a product storage system 26. The line 25 may include a pressure gauge 27, a flow meter 28 and a conductivity meter 29. Suitable valve controls 30 are also provided.

The systems further include a concentration chamber 31 and re-circulation pump 32 which may be the same pump as the main pump and this arrangement is shown in FIG. 3. The concentration chamber is arranged to receive the contaminated stream from the discharge of the membrane system. In the concentration chamber a pressure and velocity drop is caused together with a swirling action is created so as to allow contaminants to be dispelled from the flow for collection within the concentration chamber while the water extracted from the concentration chamber has a reduced concentration of contaminants. The water extracted from the concentration chamber is pumped back up to the pressure of the main supply pump by the re-circulation pump 32 and is returned to the main stream for re-supply to the membrane system.

Each of the systems further includes two separate filter elements 33 and 34 each arranged adjacent to a respective one of the ports 22, 23. Thus, when the water is flowing through the membrane system in one direction, that is from the port 22 to the port 23, the filter 33 is provided just upstream of the membrane system and the filter 34 is just downstream of the discharge from the membrane system. When the direction is reversed by the valve 10 and the port 23 constitutes the feed side and the port 22 constitutes the discharge side, the filter 34 is just upstream of the membrane system and the filter 33 is downstream of the discharge port 22. The system is thus symmetrical and allows filtration to occur on the input side of the membrane system for each direction of flow of water through the membrane system.

The symmetry of the arrangement ensures that one of the filters acts as a filter in advance of the membrane system in one direction of operation while the other filter is being cleaned and vice versa. The reversal of the flow through the membrane therefore acts automatically to effect cleaning of the filter screens. In addition the buildup of particles on the filter screen aids in cleaning when the flow is reversed due to the increase in size of the particles as they build up on the screen.

Figure 6:
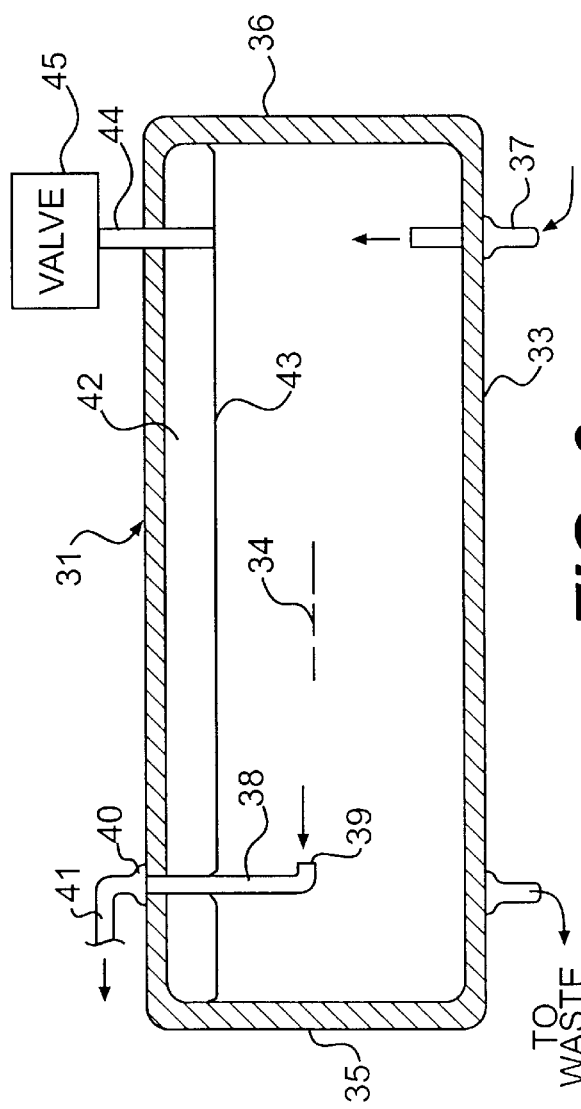
FIG. 6 is a vertical cross-sectional view of the concentration chamber of FIG. 2.

Turning now to FIG. 6, there is shown one example of the concentration chamber 31 which is of the type shown in FIG. 2 which is separate from the re-circulation pump 32. This embodiment is substantially shown in the above mentioned application and includes a cylindrical tank 33 with a central axis 34 of the tank horizontal and defining two circular end walls 35 and 36. The tank can also be generally vertical (not shown). The contaminated water stream from the membrane system is injected into the tank 33 by an injection pipe 37 which is arranged reduce the pressure and velocity in the flow and to swirl the injected water around the interior of the tank and particularly around the axis 34 so that the contaminants tend to drop from suspension and collect around the peripheral wall and particularly at the bottom of the peripheral wall. Some contaminants can also float. The contaminants when expelled from the water flow can collect therefore at any suitable location in the chamber depending upon the shape and operation of the chamber. An outlet pipe 38 has a mouth 39 on the axis 34 and extends upwardly to an outlet 40 at the wall for supply through a line 41. An air cap 42 is maintained at a top of the tank near the water level 43 by a duct 44 and valve 45. The valve 45 can be of various different types and one simple example is a float valve which prevents the escape of water but allows the escape of air so that any air reaching a bottom mouth of the pipe 44 can escape through the valve thus ensuring that the air cap does not extend downwardly in the tank below the water level 43 at the bottom mouth of the pipe 44.

Figure 7:
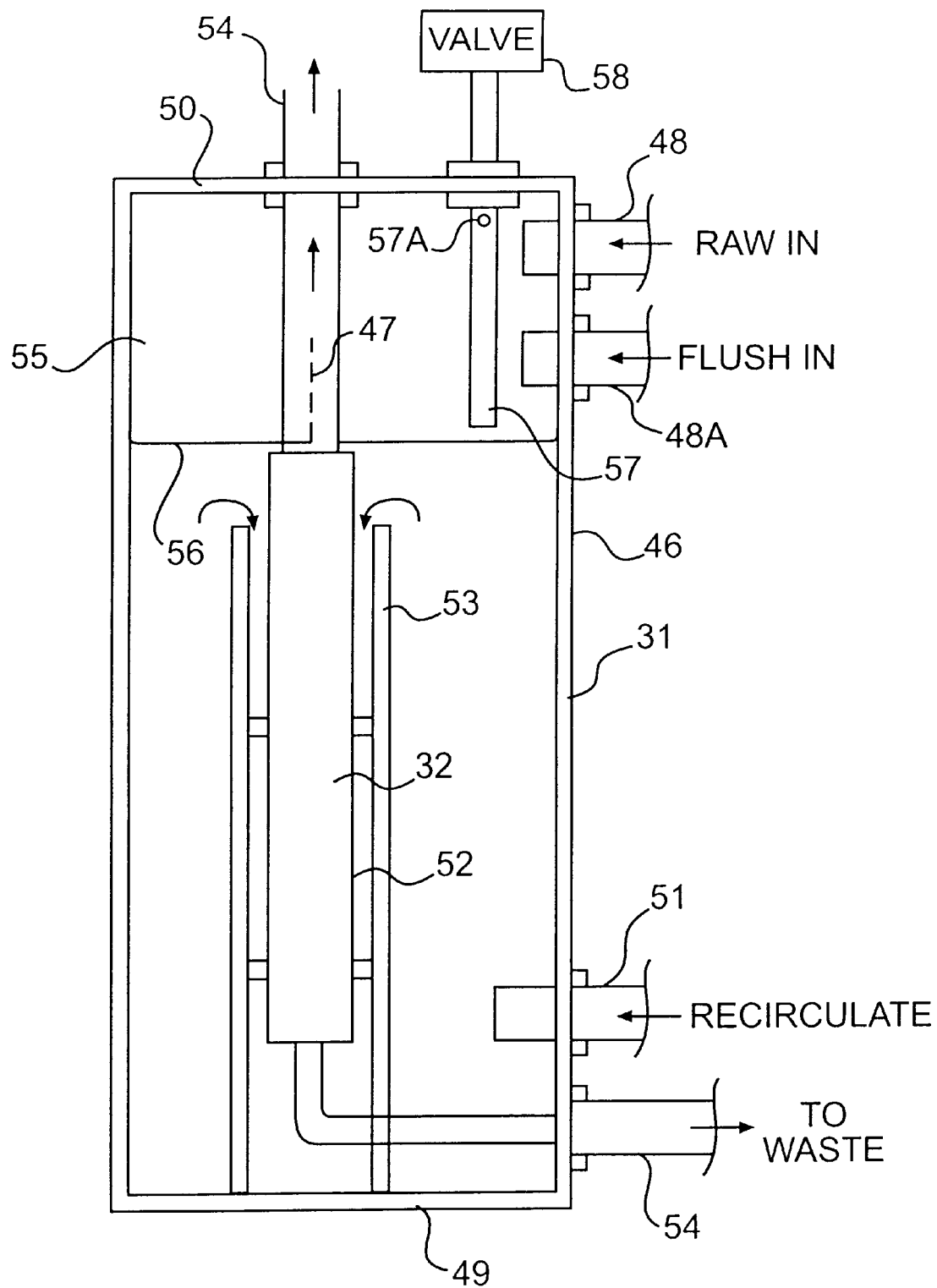
FIG. 7 is a vertical cross-sectional view of the concentration chamber of FIG. 1.

In FIG. 7 is shown a version of the concentration chamber which is used in the arrangement of FIGS. 1 or 3. Thus in this embodiment the pump 32 is mounted within the chamber 31. In this arrangement the chamber comprises a tank 36 with its axis 47 vertical so that the tank stands upon one end wall base 49. In this embodiment raw water from the pump 19 and the venturi 20 is fed through a line 48 into the interior of the tank adjacent a top wall 50. Contaminant water stream from the membrane system is fed along a line 51 and is injected into the concentration chamber again in a manner causing the water stream to swirl around the chamber and thus tend to deposit solid contaminants around the peripheral wall for collection at the base 49. The pump 32 comprises a submersible pump with an outer intake wall 52 mounted within the tank 46 within a support cylinder 53. The pump draws water into the top of the cylinder 53 after it has swirled around the outside surface of the cylinder from a position at the central axis 47 and pumps that water through an outlet pipe 54 passing through the cap 50 for supply to the membrane system.

This chamber also has an air cap 55 defining a water surface 56 which is controlled by a pipe 57 and a valve 58 as previously described. The water level is below the feed from the pipe 48 and from an additional feed pipe 48A which receives water from a flush cycle (not described herein). The pipe 57 and the valve 58 control the height of the air cap by preventing the escape of water while allowing the escape of air. Thus the air cap water level 56 cannot drop below the bottom of the pipe 57. The amount of air in the air cap is maintained due to the relatively high level of air injected into the system. The air can gradually bleed through a hole 57A in the pipe 57 but the size of the hole is arranged relative to the amount of air injected so that the air builds up in the air cap at a faster rate than it escapes through the hole 57A. However the hole 57A is provided to allow the air cap to be discharged gradually in a situation where non-aerated water is added during a cleaning cycle for the tank.

Figure 8:
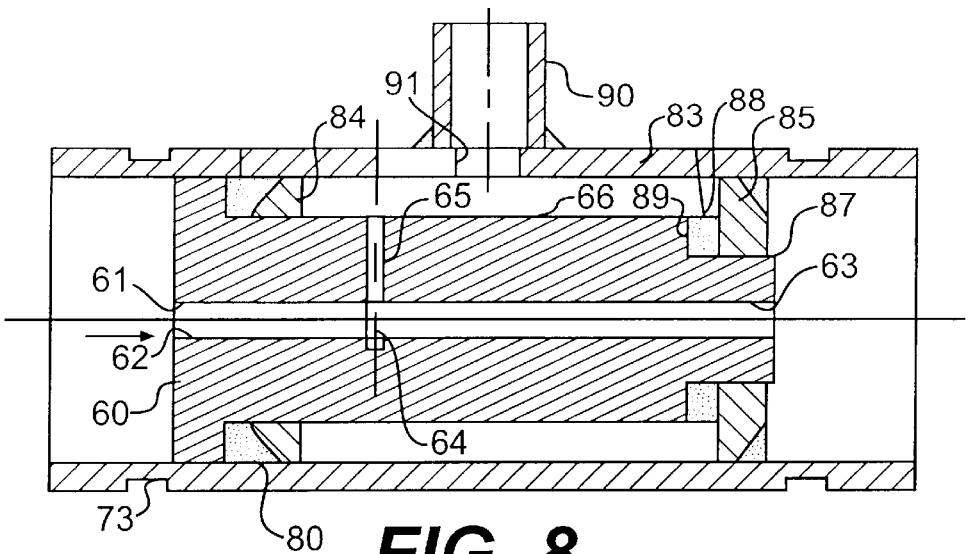
FIGS. 8, 9 and 10 are longitudinal cross-sectional view of three different arrangements of the venturi of FIGS. 1, 2 or 3 for injecting the air into the system.
Figure 9:
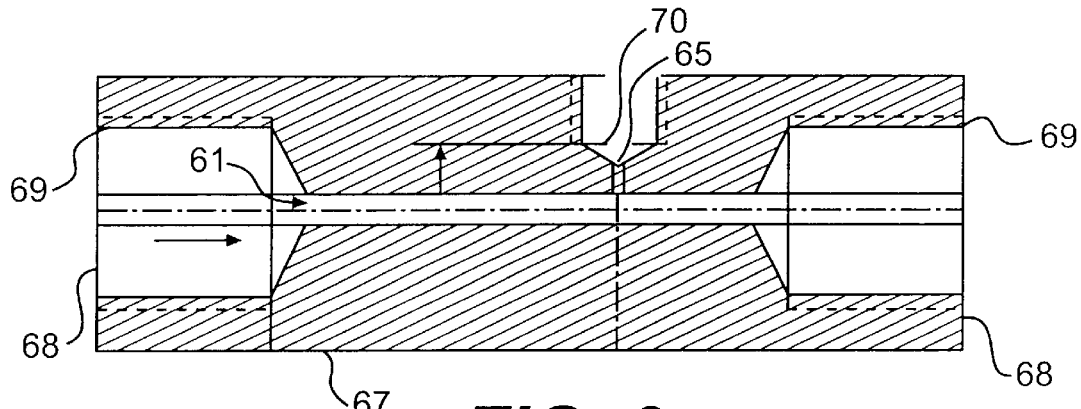
Figure 10:
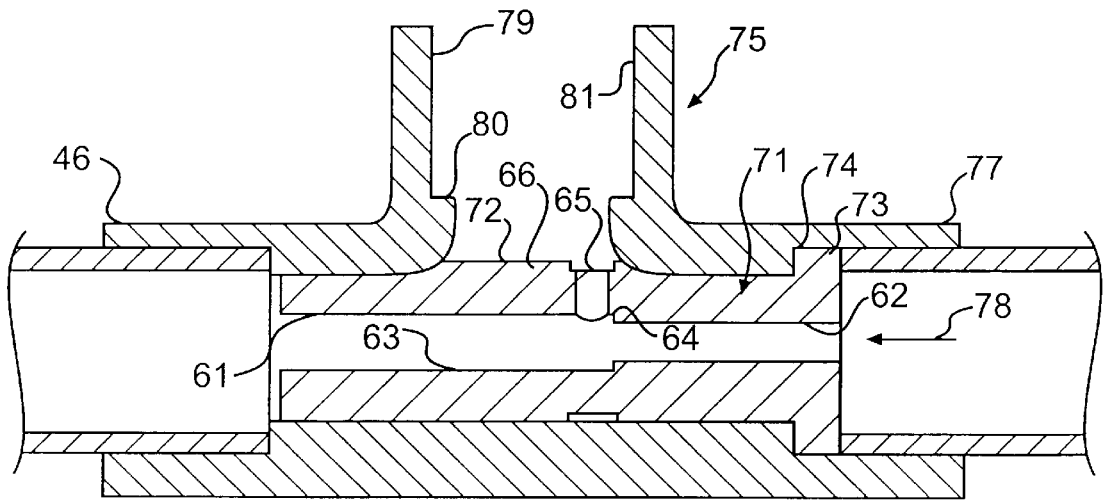

Turning to FIGS. 8, 9 and 10, three different arrangements of venturi are shown for injection of air into the raw water supply downstream of the pump 19.

Basically, each venturi comprises a venturi nozzle 60 having a duct 61 extending through the nozzle, the duct having a first portion 62 which is of smaller diameter than a second portion 63. The portions 61 and 62 meet at a shoulder 64. At the shoulder a transverse bore 65 communicates from the shoulder at the portion 63 outwardly away from the bore to an outside surface 66 allowing air to be drawn through the bore 65 to mix with the water flowing through the duct 61.

In FIG. 9, the venturi is formed by machining a cylindrical block 67 of plastics material which is cut at ends 68 of the block to form threaded bores 69 each for receiving a pipe inserted into the block. A further threaded bore 70 is formed inside of the block to communicate with the air injection bore 65. The bore 70 receives a check valve to allow the entry of air but to prevent inadvertent escape of water should pressure and flow rates change.

In the embodiment shown in FIGS. 8 and 10, the venturi nozzle is formed as a separate insert piece 71 having a cylindrical body 72 and an end cap 73. The cylindrical body 72 can slide into an existing plumbing fixture and the end cap 73 provides a shoulder 74 which abuts against a shoulder of the plumbing fixture.

Thus in FIG. 10 a conventional T-fitting 75 includes three end pieces each for receiving a pipe. The first end piece 76 and a second end piece 77 are arranged along a same axis 78 facing in opposite directions. The third end piece 79 is arranged at right angles. The end pieces each have a shoulder 80 against which the pipe received with in a bore 81 of the end piece abuts. In this embodiment the end cap 73 and particularly the shoulder 74 thereof abuts against the shoulder 80 of a selected one of the end pieces and then slides toward the opposite end piece. The third end piece acts to supply air to the bore 65. An annular recess 65B extends around the insert piece 71 and communicates fluid to the bore 65 allowing the bore 65 to be oriented in any direction around its axis.

In FIG. 8 an existing pipe portion 83 is modified to include two collars 84 and 85 each welded inside the pipe 83. In this embodiment the collar 84 defines an end face which co-operates with the end cap 73 of the insert. A sealing ring 86 is provided between the collar 84 and the end cap 73. In this embodiment the outside surface 66 of the insert is machined to form a stepped down section 87 which cooperates with the collar 85. The collar 85 thus has a smaller internal bore dimensioned to fit onto the outside surface of the turned down section 87. A second sealing ring 88 is provided between a shoulder 89 at the end of the turned down piece 87 and the adjacent surface of the collar 85.

A stub pipe portion 90 is welded onto the outside surface of the pipe at a hole 91 in the pipe so as to communicate air into the hollow interior inside the pipe and outside the surface 66 for communication through the bore 65 into the venturi duct 61.

Figure 4:
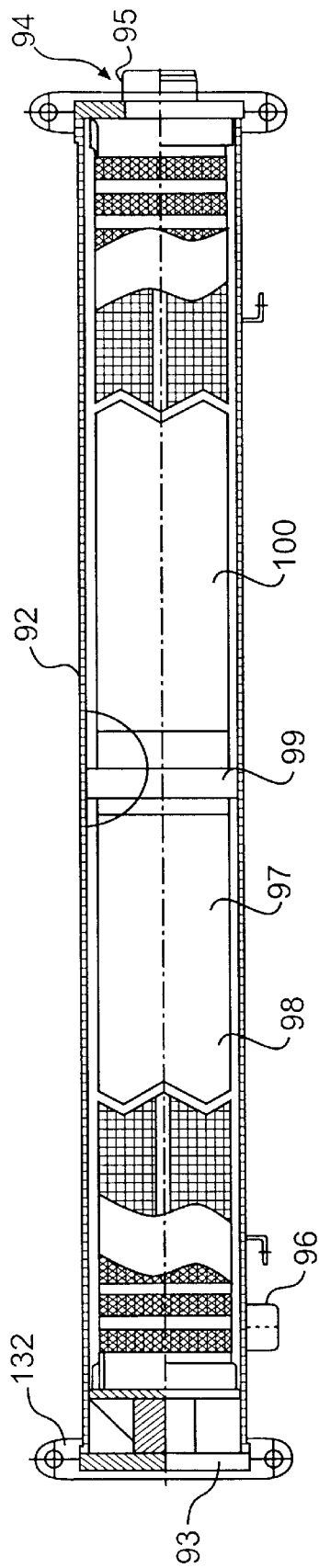
FIG. 4 is a vertical cross-sectional view of one filter of FIGS. 1 and 2.
Figure 5A:
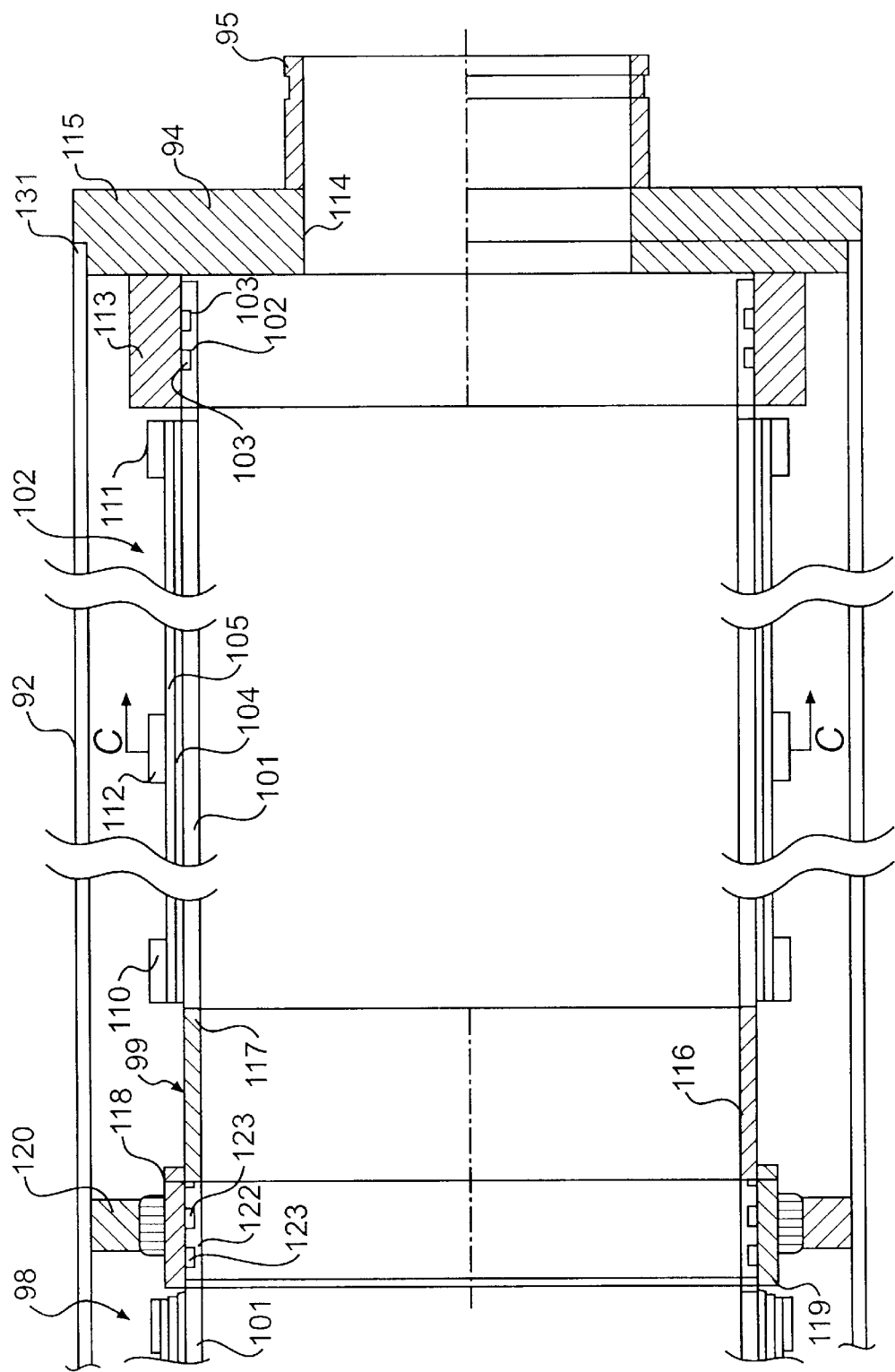
FIGS. 5A and 5B together form the same vertical cross-sectional view of one filter of FIGS. 1 and 2 as that of FIG. 3 on an enlarged scale showing the construction of the filter in more detail.
Figure 5C:
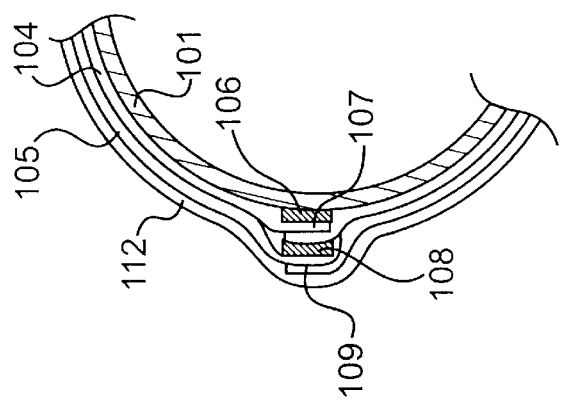
FIGS. 5C is a cross-sectional view along the lines C—C of FIG. 4A.
Figure 5B:
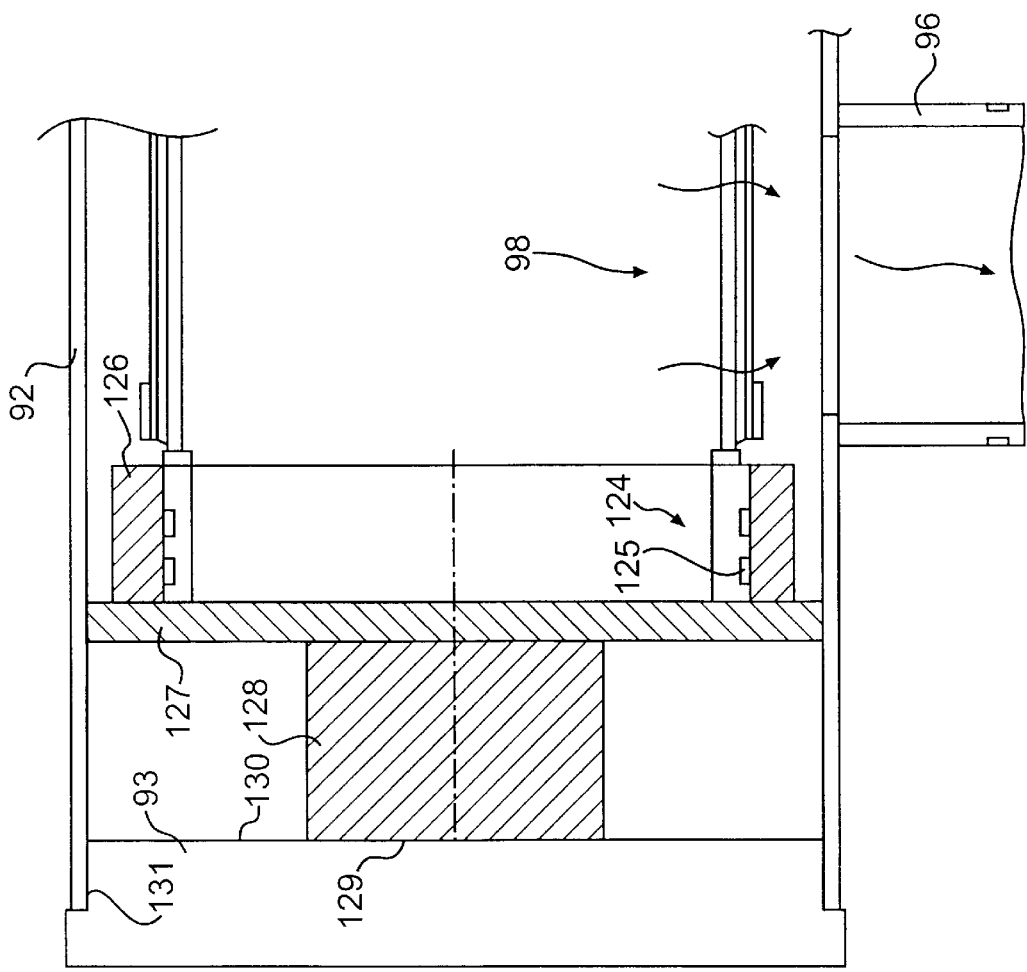

Turning now to FIGS. 4, 5A and 5B, there is shown a first construction of one of the filters 33 and 34. The filter comprises a tube 92 having a first closed end cap 93 and second end cap 94 which has a connection nipple 95 for connection to a supply line using a conventional coupling arrangement. On the outside of the tube adjacent the closed end cap 93 is provided a second nipple 96 which communicates with the hollow interior of the tube. Inside the tube is mounted a filter element 97 which is cylindrical and spaced inwardly from the inside surface of the tube 92 so that water can pass through the cylindrical surface of the filter element from the nipple 96 to the nipple 95 or vice versa.

The filter element 97 is formed in one or more element portions. In the embodiment as shown, the element includes a first portion 98 extending from the end cap 93 to a central support collar 99 and a second portion 100 extending from the central collar 99 to the end cap 94.

Each portion 98, 100 is formed from a tubular rigid body 101 in the form of a conventional well screen which has a peripheral wall having a plurality of slots so as to allow the passage of water while restricting the passage of particulates. The tubular body 101 has a collar 102 welded at one end and the central collar 99 welded at the opposed end. Thus the collars 99 and 102 define and end face which abuts with the end face of the tubular body 101 and is welded thereto. The collar 102 has a pair of 0-ring seals 103 surrounding the outside surface.

Around the tubular body is wrapped a first flexible filter screen 104 which extends around the peripheral surface and defines an overlapping strip along the tubular body 101. A second screen 105 is wrapped around the first screen 104 and again defines an overlapping strip along the tubular body. As shown in FIG. 5C, the first inside band 106 extends along the outside surface of the tubular member 101 and is located at the overlapping section 107 of the inner flexible screen 104. A second band 108 is applied overlying the band 106 and the strip 107 and is covered by a strip 109 of the overlapping section of the outer flexible screen 105. The strip 107 is spot-welded to the band 106. The strip 109 is spot-welded to the band 108. Thus the flexible screens 104 and 105 are formed into cylindrical closed bodies surrounding the tubular member 101.

The ends of the tubular flexible screen portions 104 and 105 coincide with the ends of the tubular body 101. These are wrapped by further bands 110 and 111 which surround the tubular body and clamp the screen portions 104 and 105 to the tubular body. The bands 110 and 111 can also be spot-welded to the screens to close the screens at the ends. Additional bands 112 are provided at spaces along the length of the tubular member 101 thus clamping the screens onto the tubular member and preventing billowing of the screens and the pressure from water exiting from the interior outwardly.

Thus the inner rigid tubular member 101 provides a support for the thin flexible screen. The inner tubular member can have a filter screen mesh of the order of 25. The flexible layer 104 has a filter mesh of the order of 1000. The outside flexible layer 105 is a filter mesh of the order of 25 and thus provides a support for the fine filter contained between the two outer layers.

The end collar 102 slides into an end sleeve portion 113 of the end cap 94. Thus the nipple 95 communicates with the hollow interior of the filter element through the sleeve 113 and through a hole 114 in the end plate 115 of the end cap 94.

The collar 99 includes a first collar portion 116 which has an end face 117 abutting the end of the tubular member 101. The collar 99 further includes a second collar portion 118 which is welded to and partly surrounds the collar portion 116. Thus the inside surface of the collar portion 118 has a diameter equal to the outside surface of the collar portion 116. The collar portion 118 has an end surface 119 spaced longitudinally away from the end face of the collar portion 116.

On the outside surface of the collar portion 118 is provided a plurality of angularly spaced spacer members 120 arranged at spaced positions around the peripheral surface. These spacer members are arranged to contact the inside surface of the tube 92 and hold the collar 99 centrally of the tube 92.

The second filter element portion 98 as shown partly in FIG. 5A and partly in FIG. 5B includes and end collar 122 identical to the collar 102. This collar buts with the end of the tubular member 101 of the portion 98 and therefore can slide inside the collar portion 118 and can be sealed relative thereto by the 0-rings 123 corresponding to the 0-rings 103 of the collar 102.

At the opposite end of the portion 98 is a collar 124 which corresponds to the collar 122 and has similar 0-ring seals 125. The collar 124 slides inside a sleeve portion 126 corresponding to the sleeve portion 123 of the end cap 94. The sleeve portion 126 is carried on an end plate 127 attached to a cylindrical support block 128 which extends axially away from the filter element. An end face 129 of the support block 128 abuts an inside face 130 of the end cap 93. The end caps 93 and 94 each have a recessed section 131 onto which the tube 92 is received and clamped in place by a surrounding conventional groove lock member 132.

Figures 11, 12:
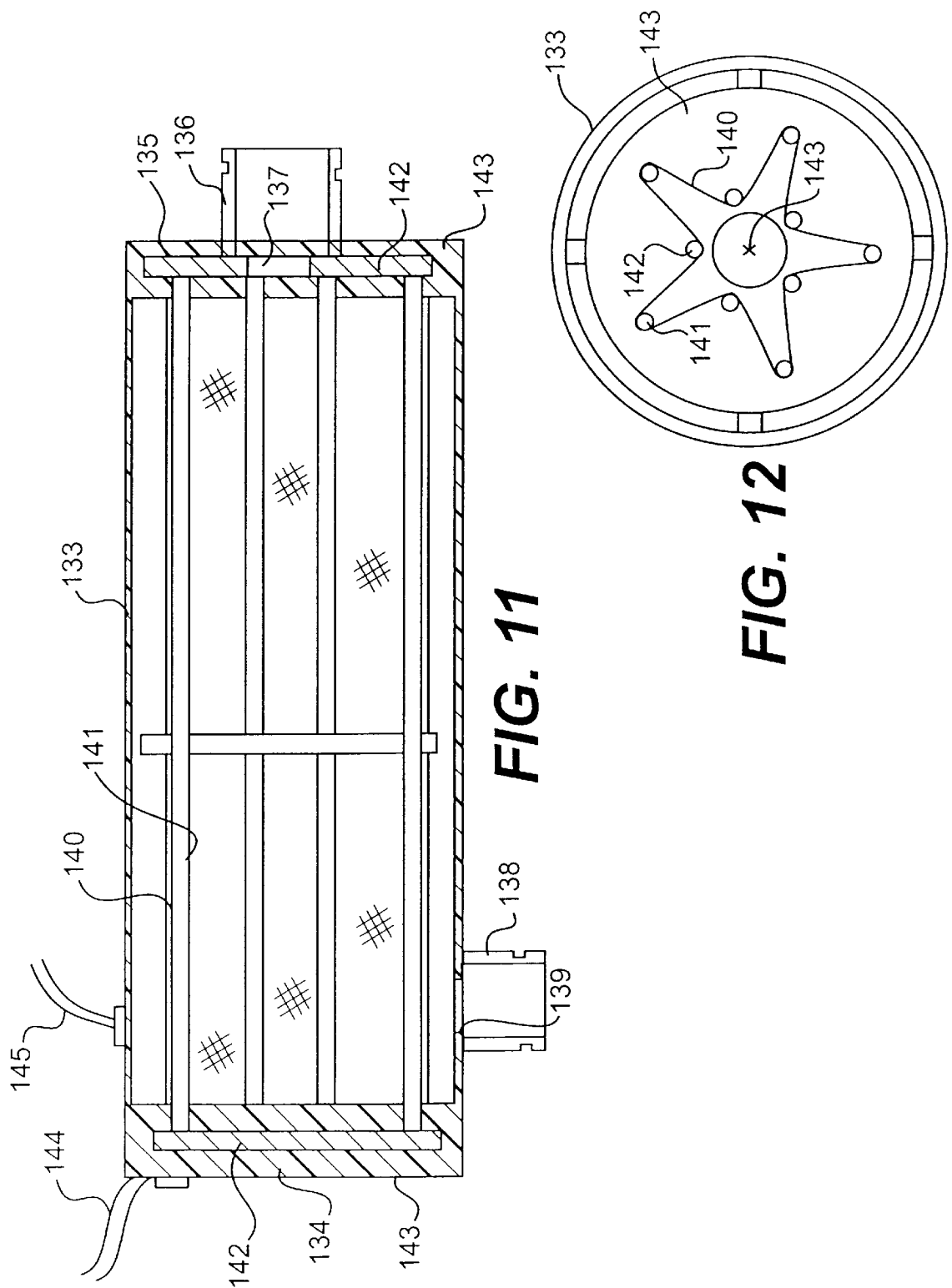
FIG. 11 is a vertical cross-sectional view of an alternative embodiment of filter for use in FIGS. 1, 2 or 3.
FIG. 12 is a cross-sectional view along the lines 12—12 of FIG. 11.

Turning now to FIGS. 11 and 12 there is shown a modified filter construction similar to that of FIGS. 3 and 4. Thus the filter of FIGS. 11 and 12 comprises an outer tube 133 closed by end caps 134 and 135. The end cap 134 includes a nipple 136 communicating with an opening 137. A nipple 138 is provided on the peripheral wall defined by the tube 133 and communicating with an opening 139. In this embodiment a filter screen material 140 is supported on a plurality of rods 141 and 142. The rods are carried on the end plates 134 and 135 so as to extend longitudinally of the tube 133. The rods include a set of outer rods 141 and a set of inner rods 142. The outer rods 141 lie on an outer circle surrounding the axis 143 of the tube 133. The inner rods 142 lie on a second circle smaller than that of the outer circle. The filter screen material 140 is wrapped inwardly of the inner rods and outwardly of the outer rods so as to form a star shape as best shown in FIG. 12. The filter screen material can be of the same construction as that previously described including an inner coarser layer, an central fine filter layer and an outer coarser layer.

Each end cap 134, 135 includes an inner metal plate 142 which is embedded within an insulating material 143. Thus the plate 142 is electrically separated from the tube 133. The plates 142 are electrically connected to the rods 141 so that voltage can be applied between the rods and the screen at one voltage and the tube at a second voltage. Wire connectors 144 and 145 allow the connection of a suitable voltage across these elements.

The use of mechanical filter screens in series with the membrane elements reduces the potential for feed spacer plugging. The screens prevent larger particulate from passing through the membrane element in one of two ways: stopping the particles at the screen, or breaking the particles into smaller pieces that will not cause feed spacer plugging.

The reversal of flow through the screens allows the particles to be flushed off of the screen surface to the concentration chamber where they may be contained until removed from the system entirely. Reversal of flow through mechanical filter elements is not performed in other systems as part of regular operation. Any flow reversal that might occur in other mechanical filters is done for the sole purpose of cleaning the element and is usually a waste wasteful manual operation.

The placement of the in-line screens in the system is unique. Other systems may incorporate raw water pre-filter devices, but placing the in-line screens in series with the membrane element in the concentration loop allows the screens to remove particles that precipitate out of solution when their solubility limits are exceeded, or when they are oxidised; these materials may not be present in the raw water as particulate, and therefore could not be removed with mechanical filtration equipment at that point.

The mesh size is chosen so that the minimum filtration ability is not sacrificed, while the maximum open area is achieved; a preferred size being 25 um. This mesh size may vary from less than 1 um to more than 200 um depending on the contaminants present in the solution to be treated and membrane element feed spacer design.

In this embodiment and the embodiment of the screen previously described, a DC or slowly alternating voltage may be supplied to the screens to assist in the catalyzation and/or the crystallisation of metallic salts and charged organic materials. The DC voltage or slowly alternating AC voltage may be applied across each individual screen with periodic polarity reversals to minimize ion migration and degradation of the screen material and to aid in removal of particles attached due to electrostatic forces. The voltage may also be applied between the two screens at each side of the membrane element, or between the screens and the product collector core, or between the screens and the membrane housing material. Periodic polarity reversal may be used to minimize ion migration between whichever two materials are charged.

A preferred material for the construction of in-line screens is stainless steel. Stainless steel may be used because of its resistance to corrosive materials. Stainless steel is not as easily mechanically damaged as other, softer metals or plastics. Stainless steel has an inherent electron deficiency which catalyzes the crystallisation process as mentioned above without the application of DC voltage. Stainless steel is not a normal choice in other systems due to its cost and tendency to clog with crystal formations due to the electron deficiency. The system uses this property of stainless steel advantageously with the implementation of the reverse flow to flush the contaminants off of the screen. The term "fabric" as used herein is intended therefore to include woven steel wire or other forms of steel mesh as well as other flexible sheet material which are pervious to water but provide interstices for collection of particulates thereon.

Materials other than stainless steel may be used in the in-line screens, each chosen for electron deficient properties, conductivity, resistance to corrosive materials, cost, ease of manufacture, mechanical strength characteristics, or any other combination of the above factors.

The geometrical configuration of the screens and the mechanical tension applied to the material is chosen so that it promotes mechanical resonance in the screen when a solution is flowing through it in the reverse direction for the purpose of breaking solids off of the surface of the screen for removal by the concentration chamber.

The gas injected is preferably air but other gases can be used including those added to air such as ozone or other oxidizing agents, or as a replacement for air.

Air injection into the concentrate or feed stream accomplishes the following main goals:

Creating and/or maintaining an air cap in the concentration chamber. The compressed air in the concentration chamber may be used to empty or "blow down" the concentration chamber. This method is preferred to displacing the contents of the concentration chamber using large volumes of water or solution from the other sources. This decreases the amount of waste solution discharged, and thus increases the overall water recovery of the system. Using compressed air to purge the concentration chamber ensures that the concentration chamber is completely emptied.

Oxygen gas at higher pressures is more reactive than oxygen gas at lower pressures. By injecting air into the system, the oxygen has a higher oxidizing potential than oxygen gas outside (is 1 atm) of the system. This allows the oxygen to oxidize a wider spectrum of metallic salts and organic materials than would otherwise be possible. These materials are removed from concentrate stream in the concentration chamber and in the inline filters and are therefore not present in the feed water to the membrane elements.

The solution that is saturated with air will act as a scrubbing agent to keep the piping and membrane open areas clean. Air injection will displace less soluble or more volatile gases such as methane, hydrogen sulfide and allow for their easy removal from the solution in the air cap of the concentration chamber before the feed water reaches the membrane elements.

Saturation of the solution with air also assists in the flocculation of organic constituents, metallic salts, and other contaminants in the concentration chamber thus enhancing their removal.

The oxygen is mostly consumed during the above reactions, so the solution saturated is predominantly comprised with gases exhibiting low reactivity (such as nitrogen) is fed to the membrane elements.

The saturation gases fed to the membrane elements is mostly comprised of less reactive gases (nitrogen) which will assist in maintaining the open areas of the water permeable layer in a thin film membrane, and/or pore structures in ultra-filtration or other porous membranes or thin-films or any other cross flow, or dead end filtration process as a consequence of the gases transference across the membranes and/or thin films and/or cross flow filtration and/or dead end filtration application.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method of treating raw contaminated water from a water supply comprising:

providing a housing having a first port and a second port;

providing in the housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom;

communicating the raw water from the water supply to the first port to pass over the membrane such that product water passes through the membrane leaving contaminants in the raw water to form a concentrated contaminated water stream and passing the stream to the second port;

providing a product water outlet port in the housing connected to the carrier duct for receiving product water therefrom;

extracting contaminants from the concentrated contaminant water stream in a concentration chamber to form a return stream;

returning at least some of the return stream to the housing at said one of the first and second ports to pass again over the element; and injecting gas into the water at a position in the system such that the concentrated contaminant water stream when it enters the concentration contains injected gas, wherein the contaminants are extracted by feeding the concentrated contaminated water stream from said other of the first and second ports to a concentration chamber which is configured to reduce the velocity of the stream to cause by the velocity change deposition of some of the contaminants therefrom so as to settle in and collect in the concentration chamber, the concentration chamber being arranged such that the stream when extracted therefrom leaves the deposited contaminants in the chamber.

2. The method according to claim 1 wherein injected gas in excess of the amount of gas necessary to saturate the concentrated contaminated water stream collects as a gas cap in the concentration chamber.

3. The method according to claim 2 wherein pressure in the cap is periodically released to cause expansion of the cap to effect purging of the chamber.

4. A method of treating raw contaminated water from a water supply comprising:

providing a housing having a first port and a second port;

providing in the housing at least one separator element arranged within the housing including a water permeable membrane with characteristic of preventing contaminants in the raw water from passing therethrough, a product water conducting layer arranged adjacent the water permeable layer, and a product water carrier duct connected to the water conducting layer for receiving water therefrom;

communicating the raw water from the water supply to the first port to pass over the membrane such that the product water passes through the membrane leaving contaminants in the raw water to form a concentrated contaminated water stream and passing the stream to the second port;

providing a product water outlet port in the housing connected to the carrier duct for receiving product water therefrom;

extracting contaminants from the concentrated contaminated water stream in a concentration chamber to form a return stream, returning at least some of the return stream to the housing at said one of he first and second ports to pass again over the element; and injecting gas into the water at a position in the system such that the concentrated contaminated water stream when it enters the concentration chamber contains injected gas, wherein gas bubbles in the gas produced by a venturi increases the flocculation of particulate contaminants such that flocculated contaminants are collected in the chamber, and wherein volatile contaminant gases are collected in an air cap in the concentration chamber.

5. The method according to claim 4 wherein the gas cap is maintained at a predetermined volume by a gas release valve having a discharge opening at a predetermined water level.

6. The method according to claim 5 wherein the gas release valve includes a slow discharge opening for continuous slow release of the gas.

7. A method of treating raw contaminated water from a water supply comprising:

providing a housing having a first port and a second port;

providing in the housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom;

communicating the raw water from the water supply to the first port to pass over the membrane such that product water passes through the membrane leaving contaminants in the raw water to form a concentrated contaminated water stream and passing the stream to the second port;

providing a product water outlet port in the housing connected to the carrier duct for receiving product water therefrom;

extracting contaminants from the concentrated contaminant water stream in a concentration chamber to form a return stream;

returning at least some of the return stream to the housing at said one of the first and second ports to pass again over the element; and injecting gas with a venturi into the water at a position in the system such that the concentrated contaminant water stream when it enters the concentration chamber contains injected gas, wherein the venturi comprises:
- a tubular member arranged for connection to a first pipe at a first end and a second pipe at a second end;
- the tubular member defining an interior bore and having an abutment shoulder within the bore;
- the tubular member having an opening in one side;
- and an insert member with a cylindrical body arranged for insertion into the interior bore and a head at one end defining a flange at said one end for engaging said abutment shoulder;
- the insert member having a venturi duct passing through the body from said one end to the opposite end at the second sleeve; and
- the insert member having an air injection bore at right angles to the venturi duct and communicating with the opening.

8. The method according to claim 7 wherein the tubular member comprises a T-fitting with a first pipe receptacle at the first end, a second pipe receptacle at the second end and a third pipe receptacle at the opening at the side and wherein the shoulder is defined by an end abutment of the first receptacle.

9. The method according to claim 7 wherein the tubular member comprises a tubular pipe having a cylindrical interior bore and at least one collar attached to the interior bore with one side face of the collar defining said abutment shoulder.

10. The method according to claim 9 wherein the tubular pipe has a first collar attached to the interior bore with one side face of the collar defining said abutment shoulder and a second collar spaced longitudinally of the first collar, the second collar having an inner diameter less than that of the first collar and the cylindrical body of the insert member having a stepped portion of reduced diameter engaging into the second collar.

11. A method of treating raw contaminated water from a water supply comprising:

providing a separator housing having a first port and a second port;

providing in the separator housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom;

communicating the raw water in a first direction from the water supply to the first port to pass over the membrane such that product water passes through the membrane leaving contaminants in the raw water to form a concentrated contaminated water stream and passing the stream to the second port;

communicating the raw water in a second direction from the water supply to the second port to pass over the membrane such that product water passes through the membrane leaving contaminants in the raw water to form a concentrated contaminated water stream and passing the stream to the first port;

periodically reversing the direction between the first direction and the second direction;

providing a product water outlet port in the housing connected to the carrier duct for receiving product water therefrom;

collecting the concentrated contaminated water stream to form a return stream, extracting contaminants from the stream and returning at least some of the stream to the housing at said one of the first and second ports to pass again over the element;

providing a first and a second filter element, each arranged adjacent a respective one of the first and second ports such that water flowing through the respective one of the first and second ports also flows through the respective filter element, the first and second ports, the first and second filter elements, the collection of the concentrated contaminated water stream and the return stream being arranged such that, in the first direction, the return stream passes through the first filter element in a first filter direction to the first port and the concentrated contaminated water stream exits from the second port through the second filter element in a first filter direction and such that, in the second direction, the return stream passes through the second filter element in a second filter direction to the second port and the concentrated contaminated water stream exits from the first port through the first filter element in a second filter direction, wherein the first and second filter elements include a filter screen formed of an electron deficient material, and applying a voltage to the filter screen.

12. The method according to claim 11 wherein the voltage is DC or slowly alternating.

13. A method of treating raw contaminated water from a water supply comprising:

providing a separator housing having a first port and a second port;

providing in the separator housing at least one separator element arranged within the housing including a water permeable membrane with a characteristic of preventing contaminants in the raw water from passing therethrough, a product water conducting layer arranged adjacent the water permeable layer for receiving water passing through the water permeable layer, and a product water carrier duct connected to the water conducting layer for receiving water therefrom;

in a first direction, communicating the raw water from the water supply to the first port to pass over the membrane such that product water passes through the membrane leaving contaminants in the raw water to form a concentrated contaminated water stream and passing the stream to the second port;

in a second direction, communicating the raw water from the water supply to the second port to pass over the membrane such that product water passes through the membrane leaving contaminants in the raw water to form a concentrated contaminated water stream and passing the stream to the first port;

periodically reversing the direction between the first direction and the second direction;

providing a product water outlet port in the housing connected to the carrier duct for receiving product water therefrom;

collecting the concentrated contaminated water stream to form a return stream, extracting contaminants from the stream and returning at least some of the stream to the housing at said one of the first and second ports to pass again over the element;

providing a first and a second filter element, each arranged adjacent a respective one of the first and second ports such that water flowing through the respective one of the first and second ports also flows through the respective filter element;

the first and second ports, the first and second filter elements, the collection of the concentrated contaminated water stream and the return stream being arranged such that, in the first direction, the return stream passes through the first filter element in a first filter direction to the first port and the concentrated contaminated water stream exits from the second port through the second filter element in a first filter direction and such that, in the second direction, the return stream passes through the second filter element in a second filter direction to the second port and the concentrated contaminated water stream exits from the first port through the first filter element in a second filter direction, wherein the first and second filter elements each comprise:
a tubular filter housing having first and second end caps;
a first port at one end cap;
a second port in the tubular housing;
a tubular filters screen mounted in the housing and attached to and carried by the end caps such that the first port communicates with the interior of the cylindrical filter screen and the second port communicates with an area outside the filter screen;
the filter screen comprising a plurality of longitudinally extending rods, end plates supporting the rods in parallel spaced relation and a fabric screen wrapped around the rods;
the rods including an outer set and an inner set;
the fabric screen being wrapped outside the outer rods and inside the inner rods so as to form a convoluted path,
wherein the inner set of rods lies on a first imaginary cylinder and the outer set of rods lies on a second imaginary cylinder larger in diameter than the first.

\* \* \* \* \*